(12) United States Patent
von Glasow

(10) Patent No.: US 6,554,437 B2
(45) Date of Patent: Apr. 29, 2003

(54) MAKE-UP MIRROR FOR VEHICLE

(75) Inventor: Christian von Glasow, 11427 High Grove, Houston, TX (US) 77077

(73) Assignee: Christian von Glasow, Houston, TX (US)

( * ) Notice: Subject to any disclaimer, the term of this patent is extended or adjusted under 35 U.S.C. 154(b) by 0 days.

(21) Appl. No.: 09/816,900

(22) Filed: Mar. 23, 2001

(65) Prior Publication Data

US 2002/0135911 A1 Sep. 26, 2002

(51) Int. Cl.[7] .......................... G02B 7/182; F21V 33/00
(52) U.S. Cl. ...................... 359/872; 362/135; 362/137; 362/142; 362/144
(58) Field of Search ............................ 359/841, 872, 359/879, 881; 362/135, 136, 137, 140, 142, 143, 144, 494; 248/476, 477, 479; 455/556, 569

(56) References Cited

U.S. PATENT DOCUMENTS

| | | | |
|---|---|---|---|
| 2,149,598 A | * | 3/1939 | Girl et al. |
| 3,821,539 A | * | 6/1974 | Kleinman |
| 4,267,430 A | * | 5/1981 | Downey |
| 4,486,075 A | * | 12/1984 | Cohen |
| 4,681,366 A | * | 7/1987 | Lobanoff |
| 4,706,273 A | * | 11/1987 | Spear et al. |
| 4,865,380 A | * | 9/1989 | Heitzman-Powell et al. |
| 5,453,915 A | * | 9/1995 | Bradley, III |
| 5,566,224 A | * | 10/1996 | ul Azam et al. |
| 5,940,503 A | * | 8/1999 | Palett et al. |
| 6,264,339 B1 | * | 7/2001 | von Glasow |
| 6,311,077 B1 | * | 10/2001 | Bien |
| 2002/0004416 A1 | * | 1/2002 | Baratono et al. |

* cited by examiner

Primary Examiner—Ricky D. Shafer
(74) Attorney, Agent, or Firm—Wendy Buskop; Buskop Law Group, P.C.

(57) ABSTRACT

A make-up or vanity mirror which is adapted to be mounted in a vehicle in such a manner that it may be optimally positioned for use by the driver/passenger without impairing the driver's vision when the vehicle is in motion. The mirror assembly may be added as an aftermarket accessory to existing vehicles or may be installed as original equipment.

The mirror is mounted on a flexible extension arm which is secured to a base which may be quickly secured to the posts of the head rest on a typical seat or to another portion of the vehicle. The mirror may include a peripheral lighting system to provide localized illumination and a microphone and speaker assembly to allow communication with a cellular phone. The mirror assembly also includes a cellular phone holder, display screen and keypad to allow a user to operate and access the cellular telephone in a complete "hands-free" mode.

4 Claims, 4 Drawing Sheets

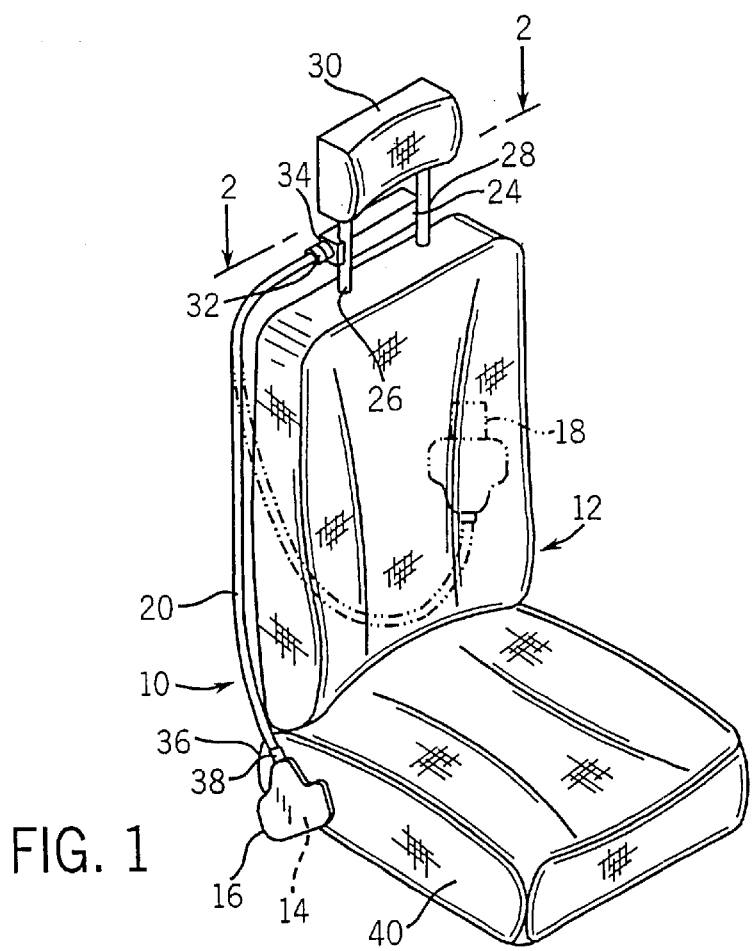
FIG. 1
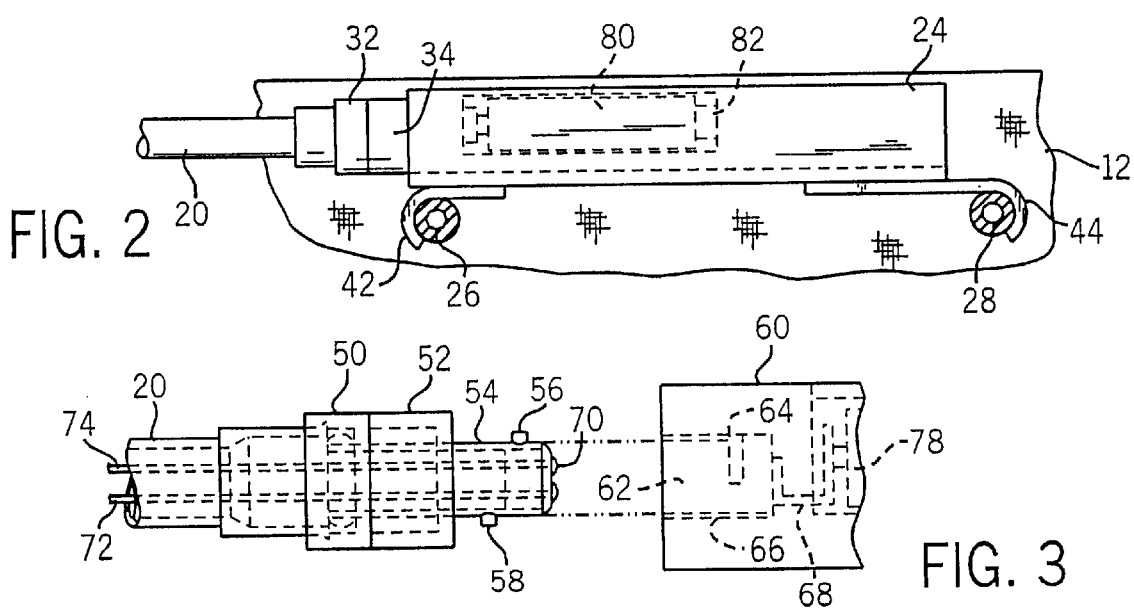
FIG. 2
FIG. 3

MAKE-UP MIRROR FOR VEHICLE

BACKGROUND OF INVENTION

1. Field of Invention

The subject invention is generally related to adjustable mirrors and is specifically directed to an adjustable mirror assembly for mounting in vehicles.

2. Description of the Prior Art

Adjustable mirror assemblies are relatively well-known. Examples of such assemblies are shown and described in U.S. Pat. Nos. 5,566,030; 5,453,915; 5,182,675; 5,105,177; 4,745,528; 3,977,645; 3,392,950 and 2,414,223. Each of these assemblies has a base, an adjustable support attached to the base and a mirror mounted in the adjustable support. In most cases the mirror is mounted for pivotal and/or rotational movement within the adjustable support. The base either is permanently mounted or includes a clamp by which the mirror assembly may be temporarily secured to a structure.

Many automobiles today have mirrors mounted in the sun screen visor positioned above the windshield in front of both the passenger and driver sides of a vehicle. In many cases, these mirrors include sidelights and may be used as vanity or make-up mirrors. While it is not intended that these mirrors be used, particularly by the driver, while the car is in motion, it is not uncommon to see women applying make-up or men shaving and looking into the mirror while driving the vehicle. An even more serious safety hazard is the use of the centrally mounted interior rear-view mirror for this purpose. When the rear-view mirror is used in this manner, it is usually adjusted to accommodate its use as a make-up mirror and its functionality as a rear-view mirror is minimized or altogether eliminated.

In addition, use of either of these types of mirrors as a vanity mirror is less than desirable even when used in a safe and proper manner. Neither mirror is positioned properly for use as a vanity mirror, requiring that the passenger adjust his/her position in the seat in order to use the mirror.

Cellular telephones are also commonly used in automobiles, frequently by the vehicle's operator. There is growing concern regarding the safety of drivers using cellular phones because such use typically requires the driver to hold the phone with one hand while steering the vehicle with the other. At present, there is a need for a make-up mirror that is convenient, safe to use and adequately adjustable to permit use without discomfort to the passenger or driver of a vehicle. There is also a need for a holder or carrier for a cellular phone which would allow a driver to operate a vehicle with the distraction of holding the phone.

SUMMARY OF INVENTION

The subject invention is directed to a make-up or vanity mirror which is adapted to be mounted in a vehicle in such a manner that it may be optimally positioned for use by the driver/passenger without impairing the driver's vision when the vehicle is in motion. The novel mirror assembly of the invention may be added as an aftermarket accessory to existing vehicles or may be installed as original equipment.

The aftermarket embodiment is a mirror mounted on a flexible extension arm which is secured to a clamp base. The clamp may be quickly secured to the posts of the head rest on a typical seat. In the preferred embodiment, the mirror includes a peripheral lighting system to provide localized illumination. The power source for the lighting system may be self-contained with a battery pack mounted in the clamp base and a wire carried in the interior of the flexible extension arm. It is also possible to house the battery pack directly in the mirror housing. An alternative power source may be provided by extending the wire from the assembly and providing a jack adapted for connecting the wire to a vehicle accessory power socket such as, by way of example, a cigarette lighter socket.

The flexible extension arm is mounted such that it and the mirror may be pivoted from a stowed position adjacent the side of the seat to a use position in front of the face of the driver or passenger. The use position of the mirror may be adjusted to individual preference. The assembly is constructed such that once the individual preference is determined, the mirror will maintain proper alignment with the rest of the assembly once the mirror and arm are returned to the stowed position. This permits the driver/passenger to quickly stow and retrieve the mirror without adjusting if for optimum position each time it is retrieved.

In the preferred embodiment, the on/of switch for the illumination system is located on the mirror case and may be quickly accessed as the mirror is moved between the stowed and use positions. It is also possible to provide an automatic on/off switch wherein the illumination system is activated when the mirror is moved from its stowed position and deactivated when the mirror is returned to the stowed position.

The mirror assembly of the invention may also be secured to the vehicle in other ways without departing from the scope and spirit of the invention. In one alternative embodiment, the base may comprise a bayonet type socket assembly with the socket being mounted at a convenient place on the vehicle such as, by way of example, on the side of the seat or on the console between the seats. The socket may be energized by the automobile power source for providing power to the mirror illumination system.

The mirror assembly may also be permanently mounted in the vehicle as original equipment, either with a self-contained power supply or with a tie-in to the vehicle power supply.

The make-up mirror assembly of the subject invention provides a safe, convenient vanity mirror for use by a driver/passenger of a vehicle without disrupting the use of other mirror functions in the vehicle and without impairing the vision of the driver when the car is in motion.

In another embodiment, the mirror assembly may also have additional features imbedded into the head of the mirror assembly. Specifically, these would be a microphone, a receiver and an electronic chip that has the capability of communicating with the users cellular telephone.

Preferably, the look and feel of the head of the mirror assembly will not be significantly changed. It is with this additional feature that the user can now use his or her cellular telephone a totally "Hands-Free" manner.

The user may then place the cellular telephone into a suitable cellular phone holder. The cellular phone holder will securely mount the users cellular phone to the vehicle. Typically, a display screen will be affixed to the phone holder, such that the user can quickly and easily view the screen. This screen may function to provide a duplicate or mirror image of the display screen of the cellular phone. In one embodiment, the screen may be moved or positioned depending on the requirements of the user. For instance, the screen may have a hinge assembly on one side that connects the screen to the holder and allows the screen to swing forward and backward in relation to the dashboard and may further allow the user to tilt the screen up or down. In this way, the hinge assembly functions in a manner similar to that found on many camcorders. Directly underneath the screen and as a part of the total unit, a keyboard or keypad may be positioned. The keypad would preferably allow a user to operate or access the features of the individual cellular phone and may allow or enable additional features that are not typically accessible from the telephone dialing pad.

The cellular phone holder may be firmly mounted on the dashboard of any car. The power source for the cellular phone holder may typically come from the cigarette lighter via a cable similar to charger cables that are used for cellular phones today.

It is, therefore, an object and feature of the subject invention to provide a make-up mirror for a vehicle which is convenient to use without impairing the vision of the driver when the vehicle is in motion.

It is another object and feature of the invention of the subject invention to provide an aftermarket accessory which may be quickly mounted in the vehicle without the use of special tools.

It is a further object and feature of the subject invention to provide a make-up mirror that is properly positioned relative to the user while seated in a vehicle.

It is yet another object and feature of the invention to provide a mirror assembly having additional features imbedded into the head of the mirror assembly. Specifically, these would be a microphone, a receiver and an electronic chip that has the capability of communicating with the users cellular telephone.

Other objects and features of the invention will be readily apparent from the accompanying drawings and detailed description of the preferred embodiment.

BRIEF DESCRIPTION OF THE DRAWINGS

FIG. 1 is a perspective view of a vehicle seat with the mirror assembly of the subject invention mounted thereon and shown in the stowed position with the use position indicated in phantom.

FIG. 2 is an enlarged partial view looking in the direction of the arrows 2—2 in FIG. 1.

FIG. 3 is an enlarged partial view of an alternative mounting system.

DESCRIPTION OF THE PREFERRED EMBODIMENT

Figure 4:
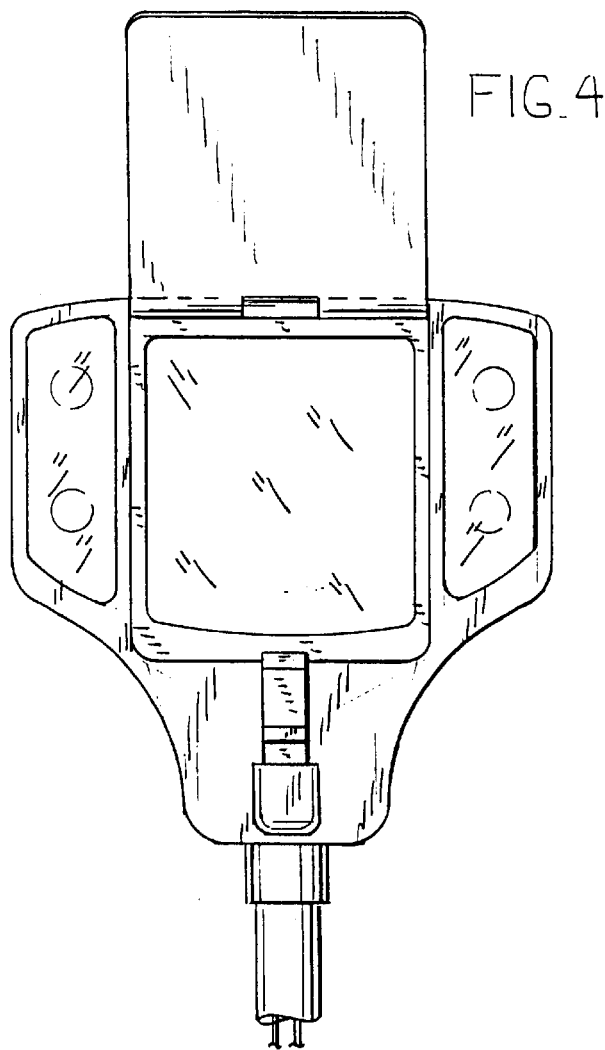
FIG. 4 is an enlarged partial view showing the front of the mirror.

The mirror assembly 10 of the subject invention is shown mounted on a typical vehicle seat 12. In the embodiment shown in FIG. 1, the mirror 14 (not visible, see FIG. 4) is carried in a housing 16, with a flip cover 18 that protects the mirror when in the stowed position of FIG. 1. The housing 16 is mounted on an extension arm 20 which in turn is mounted on a base 24. In this embodiment the base 24 is secured to the posts 26, 28 of the standard headrest 30 of the seat 12. The extension arm 20 has a base end 32 which is mounted for rotation about its axis at mount 34 of the base. The housing, also called a mirror case, 16 is mounted at 38 for rotation about the axis of the extension arm 20 on the mirror end 36 of the arm. When in the stowed position shown, the mirror case and arm are positioned out of the way of the driver/passenger along the side 40 of the seat. When use is desired, the driver/passenger simply grasp the mirror housing with his/her hand and pulls the assembly up to the use position by swiveling the arm 20 in swivel mount 34 of the base 24. The housing 16 is then swivelled or positioned on relative to arm 20 in order to position the mirror to individual preference.

In the preferred embodiment, the mirror will retain the selected position once set so that repeated movements of the assembly between the stowed and use positions do not require readjustment of the mirror. Also, in the preferred embodiment the arm 20 is made of a stiff, malleable material that may be bent by the user to further refine the position of the mirror for use. Once properly adjusted, the assembly will hold its shape until readjusted by the user.

As better shown in FIG. 2, the base 24 includes a pair of C-clamps 42, 44 adapted to secure the base to the posts 26, 28, respectively. In the preferred embodiment, the clamps 42, 44 are mounted in a slide track provided in the base 24. The clamps 42, 44 may be slidably moved into and out of engagement with the posts 26, 28 to properly secure the base and mirror assembly to the headrest. Once properly positioned the clamps may be held in place by set screws or by other means such as compression springs or the like. This allows the mirror assembly to be quickly secured to a variety of standard headrests.

Alternative mounting means may also be used such as the bayonet-type socket mount shown in FIG. 3. As there shown, the base end of arm 20 is mounted in a swivel or rotatable mount 50 which is carried in a receptive block 52. The outer end of block 52 includes a post 54 having locking pins 56, 58. The socket 60 includes a cylindrical receptacle 62 having pin-receptive slots 64, 66, whereby the entire assembly may be inserted in and locked in place in socket 60. The socket 60 is adapted to be mounted at a suitable location within the vehicle such as the side 40 of seat 12 or on the console between seats, by way of example. In many automobiles of European manufacture, the bayonet mount socket 60 is standard accessory equipment and the mirror assembly may be quickly mounted in such vehicles. In such applications, the socket is usually energized by the vehicle power supply as indicated by the electrical contact 68. The outer tip of post 54 also includes complementary electrical contact(s) 70. Flexible conducting wires 72, 74 carry the power to the mirror for energizing the illumination system 76 (see FIG. 4). For aftermarket systems, the bayonet type mount may be powered by a self-contained power supply such as battery 78 (see FIG. 3).

Figure 6:
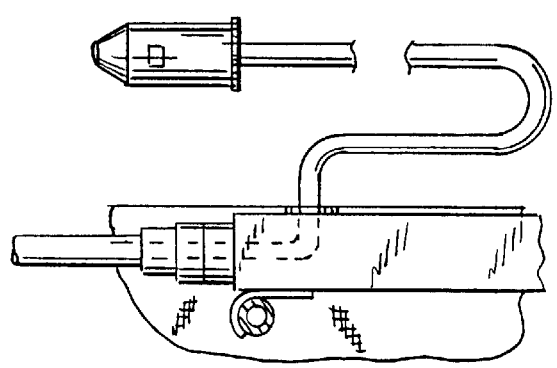
FIG. 6 is a view similar to FIG. 2, showing an alternative power hook-up.
Figure 7:
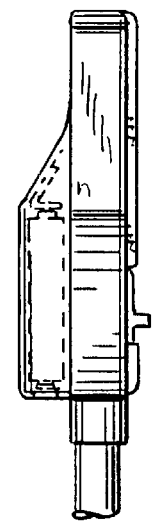
FIG. 7 is a view similar to FIG. 5, with an alternative integral power supply.

In the embodiment of FIGS. 1 and 2 the power supply is a self-contained unit such as the battery 80 carried in the battery compartment 82 of the base 24. The arm 20 is made of a hollow tube for carrying the conductive wires 72, 74 as shown in FIG. 3. An alternative power supply system is shown in FIG. 6, where the wires 72, 74 are carried in a flexible conduit extending from the base 24 and terminating in a typical cigarette lighter jack, whereby the power may be supplied via the cigarette lighter socket of a typical vehicle. It is also possible to place the self-contained power supply such as battery pack in a suitable battery compartment provided in the housing 16.

Figure 5:
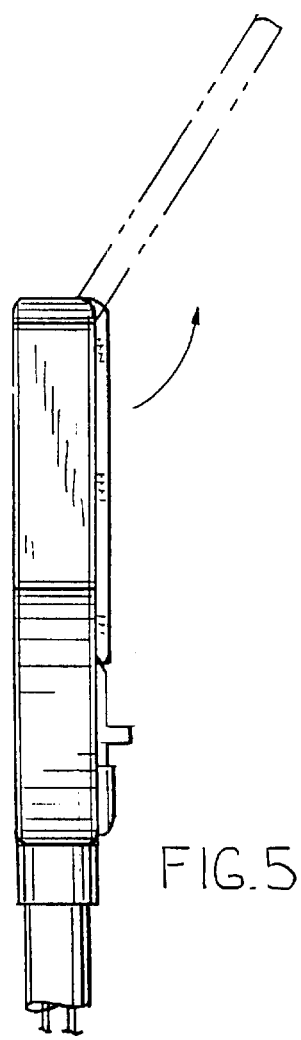
FIG. 5 is a side view of the mirror shown in FIG. 4.

As best shown in FIGS. 4 and 5, the housing 16 houses the illumination system, or side lamps, 76 behind a translucent lens for providing illumination. A flip top is hinged at and is adapted to cover the mirror 14 when the mirror is in the stowed position. The top may be spring loaded by a spring, whereby the top automatically opens when the latch 100 is released. In the preferred embodiment the latch 100 is a spring-loaded slide latch. It will be readily understood by those skilled in the arts that other latch mechanisms could be deployed without departing from the scope and spirit of the invention. The latch may also trigger the on/off switch for activating the illumination system of lights 76, or an independent switch may be used. Also, where desired, switch could be activated by the pivot mount on the base 24, whereby the illumination system is activated by movement of the assembly from the stowed position.

Figure 8:
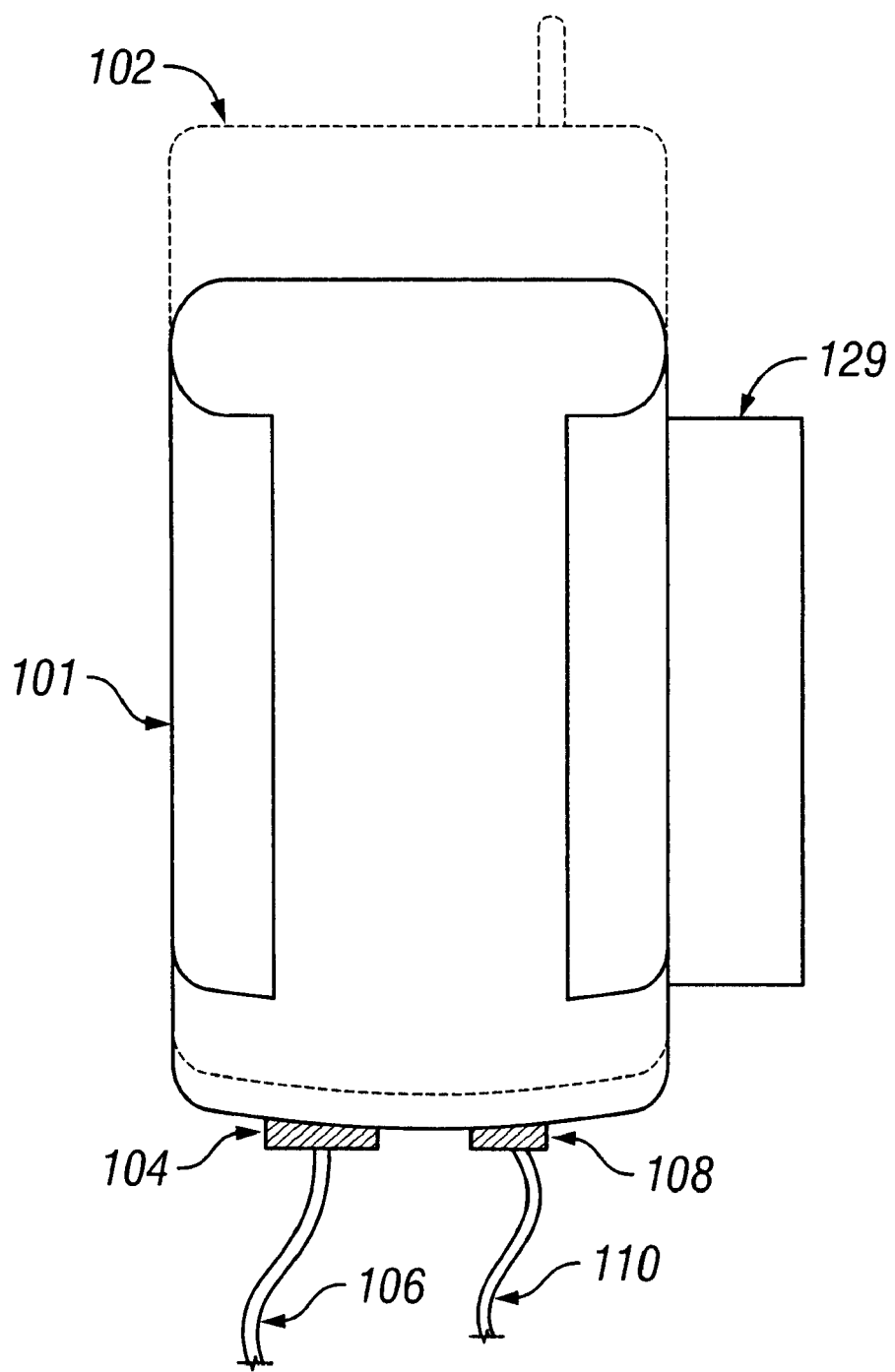
FIG. 8 shows the phone mounting system.

FIG. 8 shows the mirror assembly 10 further including a mounting system for securely and removably mounting a cellular telephone 102 to the vehicle. The mounting system includes a mounting apparatus 101 which may be of any suitable design and may be adjustable to accommodate phones of various shapes and sizes. Preferably, the mounting apparatus 101 is formed from a suitable plastic material. Although the mounting apparatus 10 is shown mounted on the dashboard of the vehicle, the apparatus may also be mounted in any suitable location and is preferably mounted in a location that does not interfere with the operation of the vehicle does not interfere with the operation of the vehicle.

In addition to mounting a cellular phone, the system may also incorporate both power and audio connections 104, 108 for the phone. For instance, a power connector 104 may be provided for supplying power to the phone for operation or for recharging the phone's battery. The power connector 104 may be connected, via suitable wiring 106, to a power source. The power source is preferably the vehicle's power source, in which case the wiring would typically extend either directly to a compatible power receptacle in the vehicle (i.e., a "power point") or to the cigarette lighter jack.

The mirror assembly 10 may also include an audio connector 108 and audio wiring 110 for allowing the audio output of the phone 102 to be transmitted to an audio output device, such as the vehicles' audio system or an external speaker or speakers. The audio connector 108 may be any suitable type, but is preferably an RCA-style connector which is capable of interfacing with cellular telephones of varying design. Suitable audio wiring may, for example, extend from the audio connector to a plug (not shown) which, in turn, connects to the vehicle's audio system. In another embodiment, the audio wiring may connect the audio connector to an external speaker or plurality of speakers.

In a preferred embodiment, the mounting system may include a mechanism or apparatus for determining when a cellular phone is mounted in the apparatus 101. When a phone is placed in the mounting apparatus 101, the system may become active. Upon activation, a speaker 120 and microphone 122 may be activated to allow the driver or operator to use the capabilities of the cellular phone through the system.

The mounting system of the present invention is preferably mounted to the dashboard of the vehicle, thereby providing a secure location for the phone that will not interfere with the operation of the vehicle. Any suitable mechanism may be used to mount the system to the dashboard.

Figure 9:
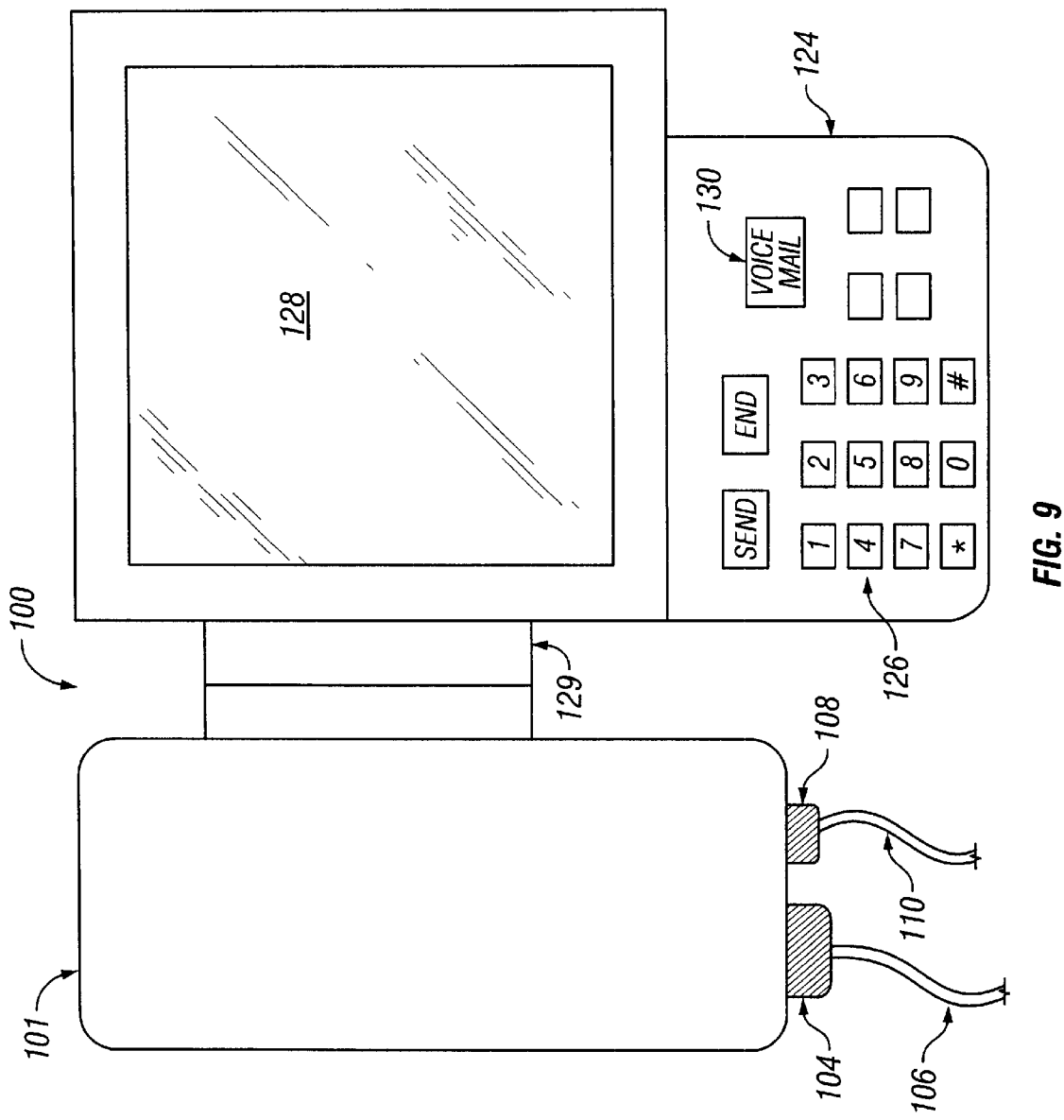
FIG. 9 shows the dialing pad, function keys and the display screen

As shown in FIGS. 8 and 9, a display screen 128 may be located in or on the dashboard of the vehicle or may be attached or mounted to the phone mounting apparatus 101. The display screen 128 is preferably an enlarged copy of the display screen of the cellular telephone. The display screen may display all the information displayed on the phone's display screen. In a preferred embodiment, the screen 128 is hingedly attached, at the screen's left edge, for instance, to the dashboard, thereby allowing the screen to swing fore and aft relative to the dashboard. The hinge may also include a mechanism whereby the screen may be tiled up or down to further allow adjustment by the user. A suitable interface may be provided to allow communication between the phone and the display screen. By providing an enlarged display screen, a driver or other user may quickly and easily determine the status of the phone or the nature of a particular call being received. For instance, upon receiving a call, the user may determine, at a glance, the person who is calling, via caller ID. The user is thus able to quickly and easily determine whether the call must be answered.

The mounting system may further include an enlarged dialing pad 124 having a plurality of keys 126. The keys may generally correspond to the keys on a cellular telephone. The dialing pad 124 may communicate with the phone through any suitable interface. The dialing pad 124 provides a more easily accessible mechanism for a user to operate the phone by providing keys which may be significantly larger than those on most phones. Although the keys on the dialing pad may generally correspond to the keys on the cellular phone, the dialing pad may also include additional keys which may perform additional functions. For instance, the dialing pad may include a "voice mail" key which would allow a user to forward an incoming call directly to a voice mailbox. A pre-recorded message may be played to inform the caller that the user is currently operating the vehicle and is unable to take the call.

In a yet another embodiment, the mirror assembly 10 contains a first wireless transmitter and receiver assembly for transmitting and receiving signals to and from a corresponding second wireless transmitter and receiver assembly in communication with the phone. The first assembly may be in communication with a microphone and speaker located in the mirror assembly 10, thereby providing a closer and more convenient mechanism to facilitate phone calls. By locating the speaker and microphone in the mirror assembly, both can be positioned significantly closer to the user, as compared to the telephone unit itself, which is mounted in the mounting apparatus. In addition, the system provides a hands-free method of conducting calls by eliminating the need for the user to physically hold the phone during a call.

In addition to the aftermarket system shown and described in detail herein it should also be noted that the mirror assembly may be permanently mounted in the vehicle as an original equipment accessory. While certain embodiments and features of the invention have been described in detail herein, it should be understood that the invention encompasses all of the modifications, improvements and enhancements within the scope and spirit of the following claims.

What is claimed is:

1. A vanity mirror assembly for a vehicle, comprising:
   a. a mirror,
   b. an elongated, flexible extension arm having one end adapted for receiving and supporting the mirror, the mirror being rotatable relative to the axis of the extension arm; and
   c. the arm having an opposite end adapted to be pivotably mounted on the vehicle and movable between a stowed position wherein the arm and mirror are a non-interfering position relative to operation of the vehicle and a use position wherein the mirror may be used as a make-up mirror by an occupant of the vehicle;

d. a base adapted to be mounted on the vehicle and wherein the opposite end of the arm is pivotably mounted in the base; and e. an illumination source for lighting the mirror, wires extending the length of the arm and outwardly from the bass and an adapter mounted on the end of the wires, the adapter adapted for connecting the wires to a vehicle power supply system.

2. The vanity mirror assembly of claim 1, wherein the adapter comprises a typical cigarette lighter socket adapter.

3. A vanity mirror assembly for a vehicle, comprising:

a. a mirror;

b. an elongated, flexible extension arm having one end adapted for receiving and supporting the mirror, the mirror being rotatable relative to the axis of the extension arm; and c. the arm having an opposite end adapted to be pivotably mounted on the vehicle and movable between a stowed position wherein-the arm and mirror are a non-interfering position relative to operation of the vehicle and a use position wherein the mirror may be used as a make-up mirror by an occupant of the vehicle;

d. a base adapted to be mounted on the vehicle and wherein the opposite end of the arm is pivotably mounted in the base;

e. wherein the base further comprises a bayonet type pin having an axis and wherein the vehicle further includes a bayonet type accessory socket for receiving and locking the bayonet type pin to secure the mirror assembly in place;

f. wherein the opposite end of the arm is secured in the bayonet type pin;

g. wherein the arm is mounted for rotation about the axis of the bayonet type pin; and h. an illumination source for lighting the mirror, wherein the bayonet type accessory socket is energized by a vehicle power supply, wherein the bayonet type pin includes electrical contacts, and wires are carried in the arm for connecting the electrical contacts to the illumination source.

4. A vanity mirror assembly for a vehicle, comprising:

a. a mirror;

b. an elongated, flexible extension arm having one end adapted for receiving and supporting the mirror, the mirror being rotatable relative to the axis of the extension arm;

c. the arm having an opposite end adapted to be pivotably mounted on the vehicle and movable between a stowed position wherein the arm and mirror are a non-interfering position relative to operation of the vehicle and a use position wherein the mirror may be used as a make-up mirror by an occupant of the vehicle;

d. a housing, the mirror being further adapted to be mounted in the housing and the housing being adapted to mounted on the one end of the arm;

e. wherein the housing further includes a cover adapted to place the mirror in a protective covering when in the stowed position and to be removed to expose the mirror when in the use position;

f. wherein the housing further includes a latch for holding the cover in place;

g. an illumination source for lighting the mirror and connectors for connecting a power supply to the illumination source; and h. wherein the latch includes a switch disposed between the illumination source and the connectors and adapted for connecting the connectors to the illumination source when the mirror is in the use position and the cover is exposed and for disconnecting the illumination source from the connectors when the mirror is covered.

* * * * *